United States Patent
Lovberg et al.

(10) Patent No.: US 7,248,204 B2
(45) Date of Patent: *Jul. 24, 2007

(54) SECURITY SYSTEM WITH METAL DETECTION AND MM-WAVE IMAGING

(75) Inventors: John A Lovberg, San Diego, CA (US); Vladimir Kolinko, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/903,129

(22) Filed: Jul. 30, 2004

(65) Prior Publication Data

US 2005/0093733 A1    May 5, 2005

Related U.S. Application Data

(63) Continuation-in-part of application No. 10/728,432, filed on Dec. 8, 2003, and a continuation-in-part of application No. 10/639,322, filed on Aug. 12, 2003, now Pat. No. 6,937,182, and a continuation-in-part of application No. 09/965,875, filed on Sep. 29, 2001, now abandoned.

(51) Int. Cl.
*G01S 13/04* (2006.01)
*G01S 13/88* (2006.01)

(52) U.S. Cl. .................. 342/22; 342/27; 342/179
(58) Field of Classification Search ............. 342/22, 342/27, 179
See application file for complete search history.

(56) References Cited

U.S. PATENT DOCUMENTS

| | | | | |
|---|---|---|---|---|
| 5,557,283 A | * | 9/1996 | Sheen et al. ............. 342/179 |
| 5,859,609 A | * | 1/1999 | Sheen et al. ............. 342/179 |
| 6,937,182 B2 | * | 8/2005 | Lovberg et al. .......... 342/22 |
| 2004/0080448 A1 | * | 4/2004 | Lovberg et al. .......... 342/22 |
| 2005/0110672 A1 | * | 5/2005 | Cardiasmenos et al. ... 342/27 |
| 2005/0232459 A1 | * | 10/2005 | Rowe et al. .............. 342/179 |

FOREIGN PATENT DOCUMENTS

WO    WO 99/21148    * 4/1999

\* cited by examiner

*Primary Examiner*—Ian J. Lobo
(74) *Attorney, Agent, or Firm*—John R Ross

(57) ABSTRACT

A concealed weapons and contraband detection system combining metal detection equipment with millimeter wave imaging equipment. The preferred millimeter wave imaging equipment includes at least one millimeter wave frequency scanning antenna for collecting frequency dependent beams of millimeter wave radiation from a narrow one-dimensional field of view. The collected radiation is amplified at the collected frequencies and the amplified signals are separated into frequency dependent bins with a tapped-delay beamformer. These bins are then sampled to produce a one-dimensional image of the antenna field of view. A two dimensional image of a target may be obtained by moving the target across the field of view of the scanning antenna or by moving the antenna in order to scan its line of focus over the target. In preferred embodiments the millimeter wave imager is combined with an active eddy current type metal detector to provide a hybrid system providing important advantages over prior art security systems. Preferred embodiments include hybrid portal systems and hybrid hand-held systems.

43 Claims, 16 Drawing Sheets

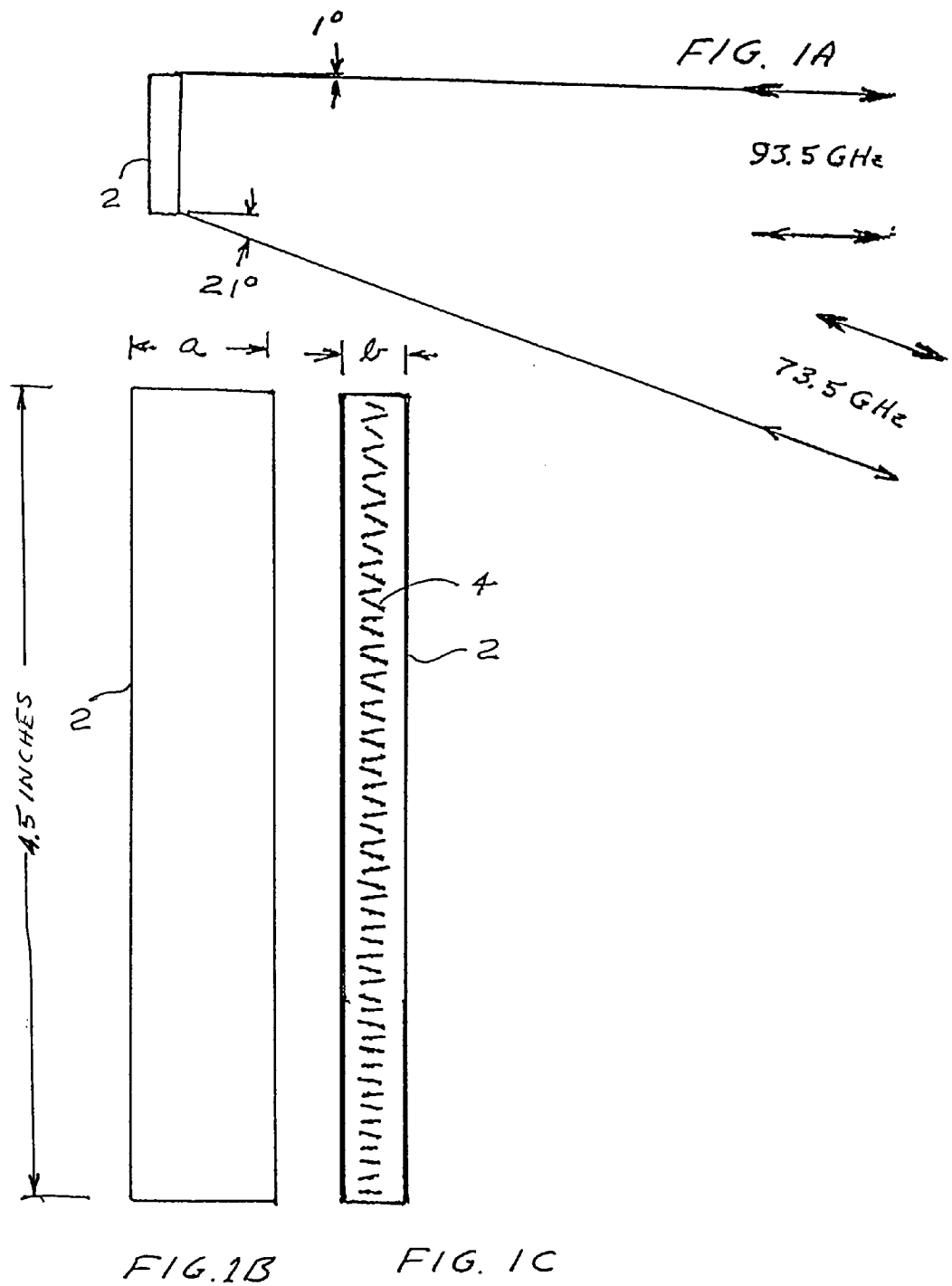

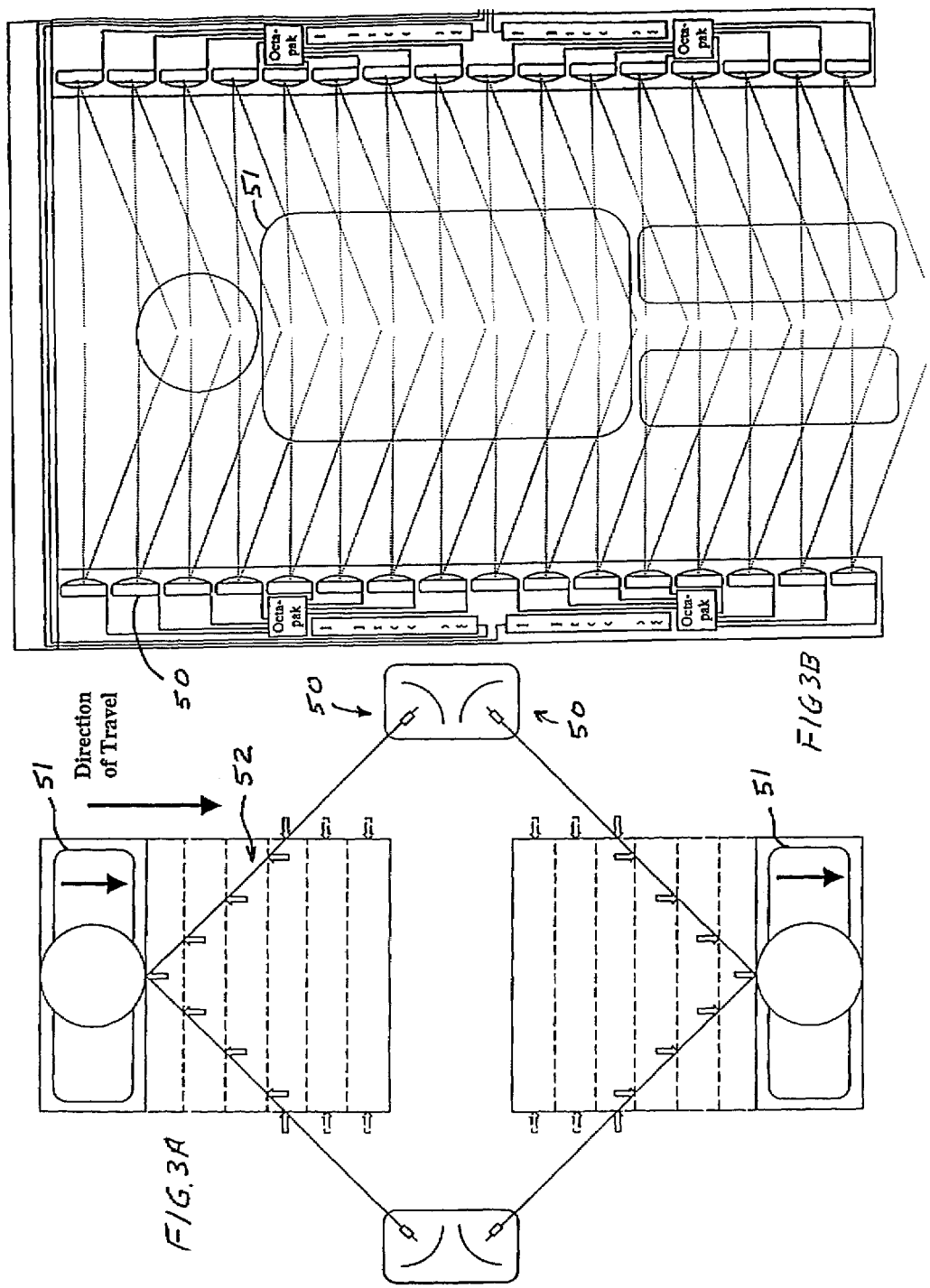

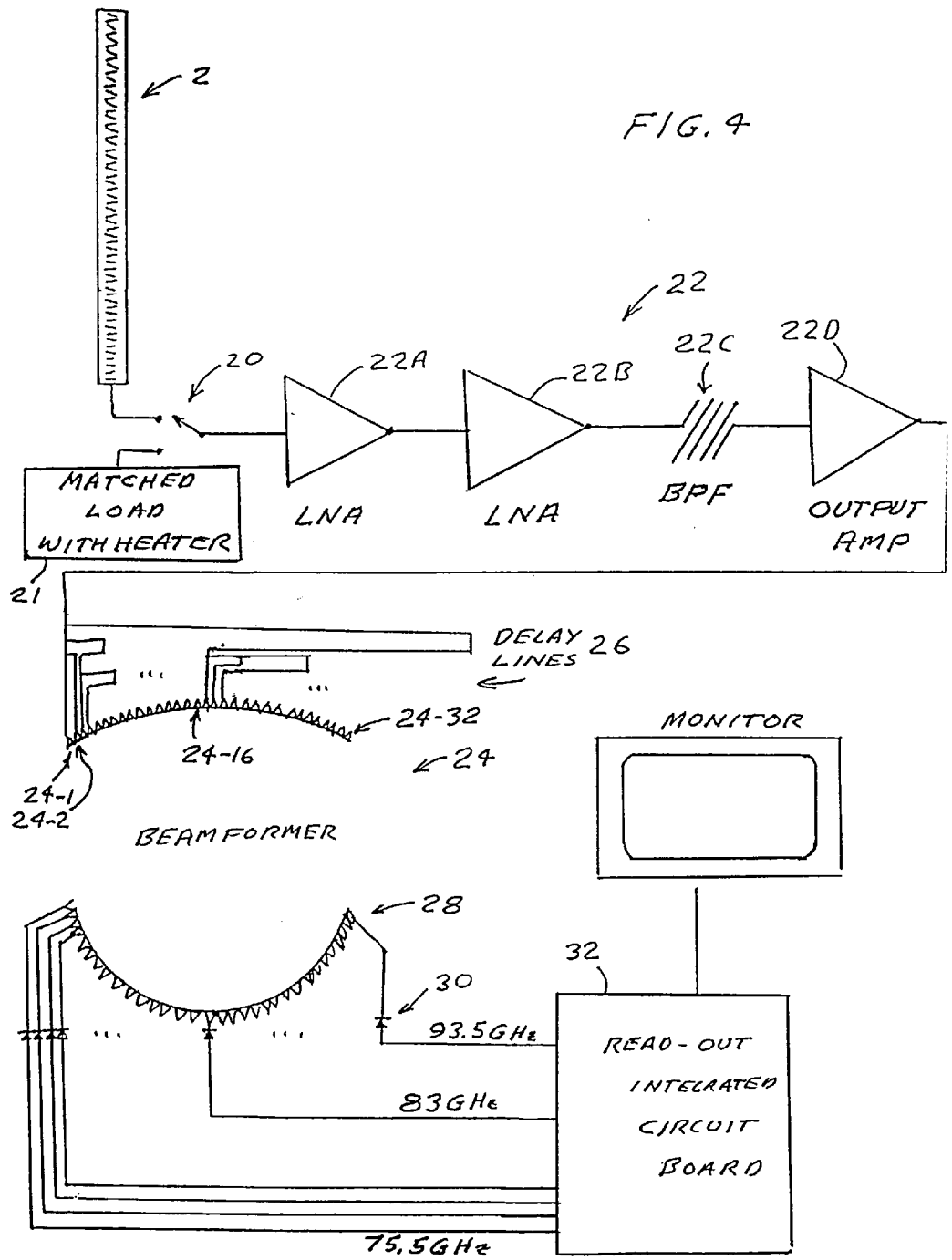

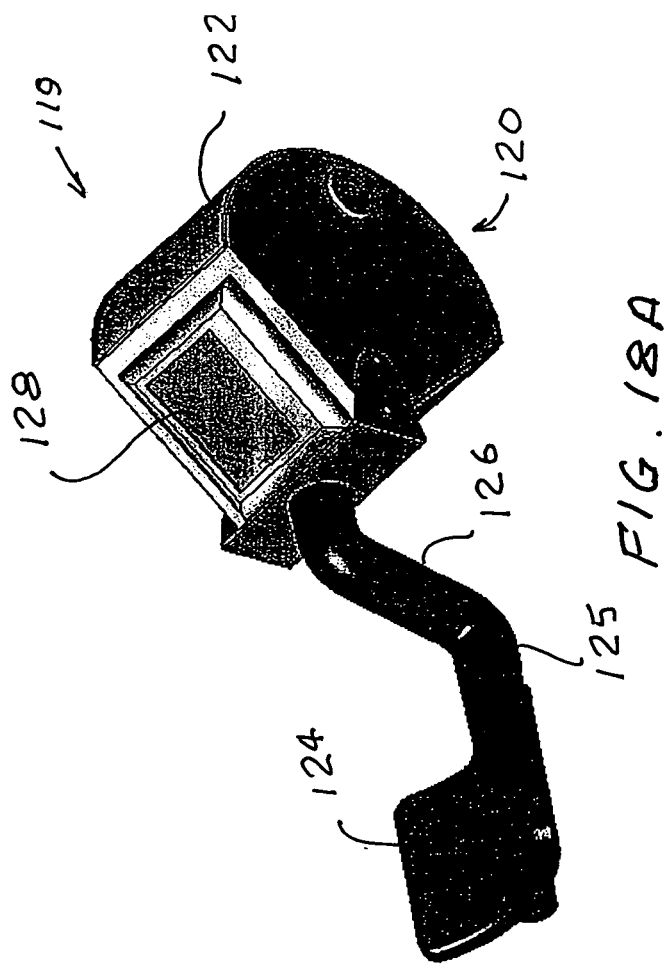
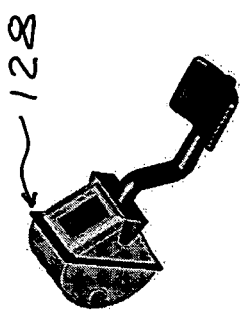

SECURITY SYSTEM WITH METAL DETECTION AND MM-WAVE IMAGING

The present invention is a continuation in part of U.S. patent application Ser. No. 09/965,875, filed Sep. 29, 2001, now abandoned Ser. No. 10/639,322 filed Aug. 12, 2003 now U.S. Pat. No. 6,937,182 and Ser. No. 10/728,432 filed Dec. 8, 2003 each of which are incorporated by reference herein. The present invention relates to inspection systems and in particular to metal detectors and millimeter wave imaging systems.

BACKGROUND OF THE INVENTION

Metal Detectors

Metal detectors are very well known and are used extensively in security applications. An important use is in walk-through portal security devices for the detection of concealed weapons and contraband. Such portal devices are currently used at most airports for passenger screening. Metal detectors are generally subdivided into passive and active types. The passive types are designed to detect ferrous materials and are not sensitive to other metals. Active systems excite eddy currents in conductive materials and measure their magnetic response. Due to low conductivity of most ferrous materials the active systems are less effective in detecting ferrous metals. In advanced security portals individual sensors are responsible for detection of objects located at various height levels (screening sectors). The operation of an active type metal detector is explained by reference to FIG. 17. A time varying magnetic field 110 from source coil 112 produces eddy currents in conductive object 114 that in turn produce magnetic fields 116 that produce currents in detector coil 118 that indicates the presence of conductive object 114.

Millimeter Wave Imaging Systems

Imaging systems operating at millimeter wavelengths (1 cm to 1 mm; 30 GHz to 300 GHz) are well known. These systems can be important because radiation at these wavelengths is not completely attenuated by substantial distances of fog or smoke, as is visible light. Radiation at millimeter wavelengths will also penetrate clothing and significant thickness of materials such as dry wood and wallboard. These millimeter wave imaging systems have therefore been proposed for aircraft to improve visibility through fog and for security applications for detection of hidden weapons and the like. Such systems are described in U.S. Pat. Nos. 5,121,124 and 5,365,237 that are assigned to Applicant's employer. The systems described in those patents utilize antennas in which the direction of collected millimeter wave radiation is a function of frequency. This type of antenna is referred to as a "frequency scanned" antenna. The collected millimeter wave radiation is analyzed in a spectrum analyzer to produce a one-dimensional image. Two dimensional images may be obtained by scanning. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced.

Other Prior Art Concealed Weapons and Contraband Imaging and Detection Systems The United States Department of Justice, National Institute of Justice in its NIJ Guide 602-00 (NCJ 184432) has provided an excellent summary of prior art concealed weapons and contraband imaging and detection systems. This guide is available on the internet at http:/www.ojp.usdoj.gov/nij. This document describes the features, both good and not so good, of the many available systems.

What is needed is a relatively low cost, easy to operate concealed weapons and contraband imaging and detection system, especially for use in portal screening for weapons and contraband.

SUMMARY OF THE INVENTION

The present invention provides a hybrid concealed weapons and contraband detection system combining metal detection equipment with millimeter wave imaging equipment. The preferred millimeter wave imaging equipment includes at least one millimeter wave frequency scanning antenna for collecting frequency dependent beams of millimeter wave radiation from a narrow one-dimensional field of view. The collected radiation is amplified at the collected frequencies and the amplified signals are separated into frequency dependent bins with a tapped-delay beam-former. These bins are then sampled to produce a one-dimensional image of the antenna field of view. A two dimensional image of a target may be obtained by moving the target across the field of view of the scanning antenna or by moving the antenna in order to scan its line of focus over the target. In preferred embodiments the millimeter wave imager is combined with an active eddy current type metal detector to provide a hybrid system providing important advantages over prior art security systems. Preferred embodiments include hybrid portal systems and hybrid hand-held systems.

In preferred embodiments the basic millimeter wave antenna is only 4.5 inches in length and constructed from WR-10 waveguide with inclined slots cut in one of the narrow walls at 79 mil spacing. This geometry (with the antenna positioned in a vertical direction) creates a frequency-scanned antenna spanning a 20 degree vertical field of view over a 75.5–93.5 GHz operational band of the sensor, starting at approximately 1 degree below horizontal at 93.5 GHz and ranging to approximately 21 degrees below horizontal at 75.5 GHz. A narrow, rod-shaped cylindrical lens covers the waveguide slots at each element and vertically focuses the antenna beam 19 inches from the antenna. The antenna is aligned along one focal axis of a vertically oriented elliptical cylinder reflector, 4.5 inches across with the second, parallel focal axis of the reflector located 19 inches from the antenna as measured along the light path. This arrangement gives a one-dimensional beam. At focus (19 inches measured along the light path from the antenna) the field of view is a little less than ½ inch wide and about 6 inches high. The system has an approximate depth of focus covering 14 inches at minimum range to about 29 inches at maximum range. The frequency-scan angular range corresponds to about 4.5 vertical inches at the minimum operational range of 14 inches. The horizontal and vertical resolution (half-power beam-width) at the center-band frequency of 84.5 GHz is about 1.57 degrees, or less than ½-inch at the 19-inch focus. A scan (of either the antenna or the target) in the horizontal direction is required for a two dimensional image. (If the antenna is positioned horizontally, the scan, of course, would be vertical.)

Preferably only one unit (antenna and electronics) is used in a hand-held imager. Scanning is accomplished by wrist or arm motion. In a preferred embodiment, a 6-inch×6-inch field of view at focus is imaged with a one second scan. The hand held unit preferably also contains a built-in metal detector, preferably an active eddy current metal detector.

For a preferred portal unit, 64 of these antenna elements are arranged in four stacks of 16 antennas to construct a portal contraband screener. Each of the four stacks of antennas is directed at regions of a portal passage to permit composite front, side and back millimeter-wave imaging of persons passing through the portal. The fixed antenna elements provide the vertical scan and the passage of the person provides the horizontal scan. Preferably, the persons pass through the portal while remaining stationary on a horizontal escalator. The preferred portal unit includes a "walk-through" metal detector In another preferred imager, called the "single stick" imager, the receiving element of the antenna is 0.6 meter in length constructed from a WR-10 slotted waveguide and a narrow, rod-shaped cylindrical lens positioned in front of the waveguide slotted wall. The waveguide is aligned along the short focal axis of a vertically oriented elliptical cylinder reflector having short focal length of 0.4 meter and long focal length of 5 meters. This imager provides a vertical one-dimensional field of view large enough, when scanned horizontally, to image a person at a focus located at a distance of 5 meters. Inclined slots are cut in one of the narrow walls of the waveguide at 2 millimeters spacing. This geometry creates a frequency-scanned antenna spanning 20 degrees in one dimensional field of view over a 75.5–93.5 GHz operational band of the receiver, starting at approximately 1 degree below the normal to the waveguide axis at 93.5 GHz and ranging to approximately 21 degrees below normal at 75.5 GHz. This antenna geometry provides approximately 25 millimeters (about 1 inch) horizontal and vertical spatial resolution at 5 meters from the apex of the reflector. Reflector is tilted back by 10 degrees such that frequency scanned angle (i.e. 20 degrees) of the beam varies within +10 degrees with respect to horizontal. Alternately, the antenna can be inverted and tilted forward by about 8 degrees. The antenna including receiving element and the reflector can be mechanically scanned in the direction perpendicular to the reflector axis. Vertical frequency-scan of the beam and horizontal rotation of the antenna produces a two dimensional raster image. Alternately, the antenna can be held stationary while people being inspected are moved horizontally across the approximately 1-inch wide vertical field of view of the stationary antenna. This can be done with a horizontal escalator or an inexpensive treadmill. Preferably, a "walk through" metal detector is positioned adjacent to the escalator or treadmill to check for concealed metal on the persons being inspected. The depth of focus covers about 500 mm (twenty inches) from 4.75 meters to 5.25 meters, so the imager can be located about 5 meters from the metal detector to obtain a focused image of a person as he passes through it.

BRIEF DESCRIPTION OF THE DRAWINGS

FIGS. 1A–1C show features of a one-dimensional frequency scanning slot antenna.

FIGS. 3A and 3B show an arrangement 64 of the above antennas in a portal contraband scanner.

FIG. 4 shows electronic circuits for converting millimeter wave signals to images.

FIGS. 18A and 18B show features of a hand held imager and hand held hybrid imager-detector.

DETAILED DESCRIPTION OF PREFERRED EMBODIMENTS 4.5-Inch Millimeter Wave Imager

Antenna Element

FIGS. 1A, 1B and 1C are drawings showing features of a one-dimensional millimeter wave antenna according to aspects of the present invention. FIG. 1A shows the elevation field of view of the basic antenna element 2. Each antenna element 2 is constructed of WR-10 waveguide and has exterior dimensions a=0.180", b=0.130" and interior dimensions a=0.100", b=0.050". The antenna element is approximately 4.5 inches long. In the fabrication of the antenna, one of the narrow walls is thinned from 40 mils to 6 mils. Then, each WR-10 waveguide antenna has 57 inclined slots 4 cut into its narrow wall at a spacing of 0.079", which serve as emitting elements. The angle of the slots, and thus the coupling coefficient, increases from 9.66 degrees on the feed end to over 25 degrees at the load end to provide nearly constant field strength along the antenna length. The direction of the angle alternates, providing a "pi" radian phase shift between successive coupling slots. This geometry creates, for a vertically mounted antenna, a frequency scan spanning a 20-degree vertical field of view (over a 75.5 to 93.5 GHz operational band of the sensor)

starting at 1 degree below horizontal at 93.5 GHz and ranging to approximately 21 degrees below horizontal.

Focusing the Antenna Element

Figure 2A:
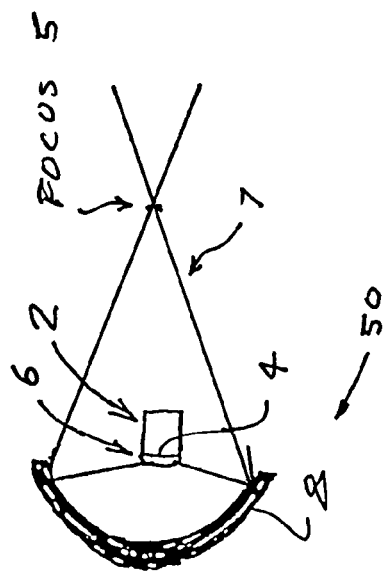
FIGS. 2A and 2B show techniques for focusing the antenna shown in FIGS. 1A–C.
Figure 2B:
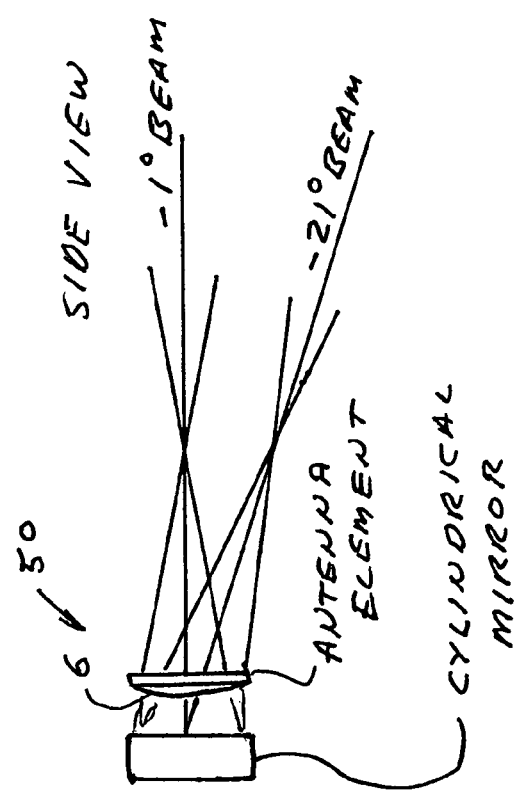

In preferred embodiments the antenna element 2 shown in FIGS. 1A, 1B and 1C is focused to 19 inches as shown in FIGS. 2A and 2B. In this case a vertically oriented elliptical cylindrical mirror 8, 4.5 inches across has one of its focal lines at the center of slots 4 of antenna element 2 that is positioned 3.5 inches from mirror 8 and its second focus 5 at 15.5 inches from mirror 8 and 19 inches from the antenna 2 as measured along the light path from focus position 5 to antenna 2 all as shown in FIG. 2A. Also a narrow rod-shaped collimating lens 6 covers waveguide slots 4 and vertically focuses the antenna beam 7 at 19 inches from the antenna as measured along the light path. At the frequency range of 93.5 to 73.5 GHz the wavelengths of the collected radiation are about 0.14 inch (3.6 mm), corresponding to the mid-band frequency, 83.5 GHz. However, in this preferred embodiment the resolution element (as described in more detail below) is somewhat larger (in the range of about 0.5 inch) in both the horizontal and vertical directions. Antenna element 2 along with its focusing elements is designated as antenna element 50 in FIGS. 2A, 2B, 3A and 3B. At the focus, the field of view of the system is a little less than ½ inch wide and about 6 inches high.

This produces a one-dimensional image since there is no resolution in the horizontal direction. A two-dimensional image is produced by scanning the antenna or the target.

Antenna Electronics

Calibration and Amplification

In this preferred embodiment Dicke switching is used for calibration of the imaging system. This technique utilizes, as shown in FIG. 4 a front-end switch 20 that alternates between looking at the antenna signal and looking at a set temperature load 21. The front-end switch 20 switches at a rate of 3.84 kHz between the antenna and a load termination. The load can be heated by approximately 40K for one switching cycle. This allows the unit to perform a two-temperature calibration in real time, compensating for gain fluctuations in the amplifiers as well as temperature offsets. The switch itself is a W-band microwave monolithic integrated circuit (MMIC) PIN switch fabricated by M/A-Com with a transmission loss of about 1.8 dB.

The front-end switch is packaged with, and feeds directly into, a front-end amplifier unit 22. This front-end amplifier unit consists of two low noise MMIC amplifiers 22A and 22B, band pass filter 22C and low noise MMIC output amplifier 22D. The amplifiers are required to have a wide bandwidth but maintain a low noise figure, as they set the noise temperature for the entire system. They operate over an 18 GHz bandwidth, from 75.5 GHz to 93.5 GHz. The first two amplifiers in the chain 22A and 22B have a noise figure of approximately 4 dB over the 18 GHz band and a gain of about 19 dB. Band pass filter 22C separates these amplifiers from the third amplifier 22D that is of a slightly different design. The third amplifier 22D, the output amplifier, is tuned for a gain of about 22 dB and is capable of generating output power of up to 1 mW before compressing. Once packaged, the entire gain stage has approximately 53 dB of gain and a noise output power of −11 dBm, with a noise figure averaging 7 dB. This includes losses from the filter and the transitions. Thus, each amplifier channel 22 provides 53 dB of gain, as well as an integrated matched load with a heater, and PIN switch for in-situ two-temperature flat field calibration. The MMIC amplifiers and the band pass filter are preferably fabricated using a co-planar waveguide design on an indium phosphide substrate.

Tapped Delay Beamformer

This broadband amplified antenna power is fed into a tapped-delay beamformer as shown in FIG. 4 for decomposition into frequency bins representing a vertical frequency image of the antenna field of view. Delay lines 26 transmit the amplified antenna signal into 32 signal ports of beamformer 24. Beginning at port 24-1 at the left side of beamformer 24, the signal to each port is delayed by 36 ps (relative to its left side neighbor port). The 36 ps delay is equivalent to three wavelengths at centerband of 83.5 GHz. (The millimeter wave frequency of 83 GHz wave in air corresponds to a wavelength of about 3.6 mm, and light travels that far in about 12 ps.) Thus, a signal arriving at port 24-1 at time 0 would also arrive at port 24-2 at time 36 ps, would arrive at port 24-16 at time 576 ps and would arrive at port 24-32 at 1.152 ns. The series of 32 taps samples a total time interval of 1.152 nanoseconds, yielding a frequency resolution of 870 MHz for the beam-former. (The frequency resolution for these beam-formers is the inverse of the total time spread; so in this case 1/1.152 ns=870 MHz.) The beam-former sorts the 18,000 MHz broadband signal from the antenna into 32 frequency bins represented by 32 output ports 28. This provides an average separation between frequency bins of 580 MHz, thus over sampling the vertical focal plane by about 2.4× relative to the 1408 MHz bandwidth of each antenna beam. (The frequency separation is 18,000 MHz/31=580 MHz, and the beam-width of the antenna beams is approximately equal to the inverse of the time [about 0.71 ns] for light to traverse the antenna element [1/0.71 ns=1.408 MHz].) Losses in the delay line, the beam forming lens, and input transition, as well as bandwidth splitting losses drop the power level at each lens output to about −36 dBm. A set of 32 sensitive detector diodes 30 integrates this power in the 32 frequency bins for each channel to provide a voltage signal corresponding to the intensity of the millimeter wave light collected by the antenna element at each of the 32 frequency ranges. The voltage signal from each of these dioded signals is then read out by multiplexing readout integrated circuit chips on readout integrated circuit board 32.

The beam-former is implemented in a low loss dielectric, such as polypropylene, with smooth copper cladding. The delay lines 26 are created at very low cost with a lithographic etching that creates the circuit pattern, which is then sandwiched between two ground planes in a heated press. In preferred embodiments, the smoothness of the copper making up the inside surface of the delay lines is extremely important. Applicants have discovered that they could reduce the losses in these lines from 1.2 dB/inch to about 0.5 dB/inch by requiring that the copper surface roughness not exceed 300 nanometers. Prior art microwave surface roughness specifications were 1400 to 2900 nanometers. As explained above, the signals from these 32 taps are launched into beamforming lens 24, which steers each signal frequency range into one of 32 output ports 28.

Portal Contraband Screener

In a preferred embodiment of the present invention shown in FIGS. 3A and 3B, 64 antenna elements of the type discussed above are utilized to provide a portal contraband screener. In this preferred embodiment four sets of 16 vertically stacked antenna elements 50 are arranged to monitor persons passing through a portal preferably on a horizontal escalator at a known velocity of about 1.5 feet per second. Each antenna element is 4.5 inches long (with a 0.5 inch spacing between elements) so the stacks are 80 inches high with two of the stacks 10A and 10B arranged to view the person's front and side and two of the stacks 10C and 10D arranged to view the person's side and rear all as shown in FIGS. 3A and 3B.

As a person 51 approaches the portal, which is about 41 inches wide; he/she enters the area of focus at a distance equal to roughly half the portal width (20.5 inches) from the portal centerline. At this range the forward-looking imaging antennas in stacks 10A and 10B are focused on the subject's front midline. As the person moves closer to the portal, the sensor foci sweep outward from the midline as indicated at 52 to generate a full 2-D image of the front and sides of the person. At the nominal travel speed of 1.5 feet per second, the antenna beam moves through one resolution element approximately every 40 milliseconds. The imager reads out at 30 Hz, slightly over sampling the horizontal plane. In one second, as the person moves forward by 18 inches, the two antennas combine to record 60 columns of image pixels surrounding the front and two sides of the subject, separated horizontally by less than a quarter-inch projection. As the person leaves the portal, a second pair of antennas in stacks 10C and 10D images his/her back and sides in the same manner.

Electronic Features of the Contraband Screener

In this embodiment, the 16 antenna elements making up each antenna column feed 16 receiver channels with an amplifier set and beam-former for each antenna. The amplified signals from the antenna elements are processed as a pair of images, one representing the front and sides of the person and the other representing the sides and rear of the person passing through the portal. In this preferred embodiment the sensors operate at a 30 Hz rate, producing 30 images per second. If we set the passage so that the image time for both front and rear images take one second each, both front and rear images will each contain 60 pixels in the horizontal direction. For the vertical direction, each of the 16 antenna elements in each column produces 32 angular beams for a total of 512 angular beams. These beams will be equally spaced in the vertical direction over 80 inches only at about 7 inches from the antenna stacks and will overlap beyond about 7 inches. Thus, both the front and rear images will each contain about 60 pixels across and 512 pixels high, and the images will produce a wraparound view of the person traversing the portal. The pixel size is about 0.5 inch in the horizontal direction and about 0.16 inch in the vertical direction at a range of 7 inches from the stacks. For those portions of the person located substantially farther from the antenna stacks than 7 inches, the pixel data could be modified with computer software to accommodate the overlap to produce continuous stitched wrap-around images.

Each of the 16 amplifiers in each column holds a switch and up to four cascaded gain stages with WR-9 inputs. Each amplifier includes connections for power and control signals and adequate shielding to prevent feedback in the gain stage.

Background and Illumination

When a person is not passing through the portal, the antenna arrays have nothing within their focal area and instead receive signal from a broad area beyond the focal region. This area can be coated with millimeter absorptive foam at ambient temperature. The foam acts as a blackbody at millimeter wave frequencies, emitting a fixed, broadband signal to the antennas. If the foam temperature is less than the temperature of a human body, the foam provides a good contrast to a person passing through the detector. This improves the clarity and sharpness of the generated images. Also, in preferred embodiments contour contrast can be added to the images of the persons being screened by providing a cold surface above the portal that would be a source of low temperature thermal radiation. Therefore, millimeter radiation in the band detected by the antenna elements that is reflected off the person after being emitted from the cold source will be very small compared to reflected radiation from other surrounding warmer sources. As a result the scanner will see substantial contrasts on the persons scanned depending on the angular orientation of various portions of his body, his clothing and potential contraband.

Privacy Issues

A preferred application of the present invention as described above includes the visual examination beneath the clothing of people in search of weapons or other contraband. An example would be at an inspection portal at airports. This requires the examination of many innocent people. The images obtained show features of the peoples' warm skin. Body parts normally covered with clothing are imaged with resolutions of about 0.5 inch. Therefore, privacy issues must be recognized and dealt with. In a preferred application of the portal contraband screener, two separate screeners are provided, one marked "women," and one marked "men." Inspection personnel for the women screener are female and inspection personnel for the men screener are male. The monitors showing images of the people being inspected are protected from public view and images that are saved for evidentiary purposes are carefully controlled by inspection personnel. Any person would have the right to not be screened by the contraband screeners but persons exercising that right would be subject to an appropriate manual search.

In another preferred embodiment, computer software would be provided to blur the images at the location of sensitive body parts. In another preferred embodiment, sophisticated software is provided which provides recognition of specific contraband such as guns, knives, and bombs. An alarm signal (audible and/or visual) could then be provided if there is an indication of such contraband on the body of a subject so that the person could be selected for a more specific search. The software could also locate the suspected contraband by placing an appropriate logo on the subject's image at the position of the contraband. Alternatively, of the 64 image segments recorded only those showing skin contact anomalies are displayed.

26-Inch Single Stick Imager

Another embodiment of the invention utilizes a low cost "single stick" imager. In this case, the unit has only one antenna which is generally as described above but in this specific case, the antenna is 26 inches long as compared to the 4.5-inch antennas used in the portal contraband screener described above and the hand-held unit described below.

The Antenna

Figures 8A, 8B:
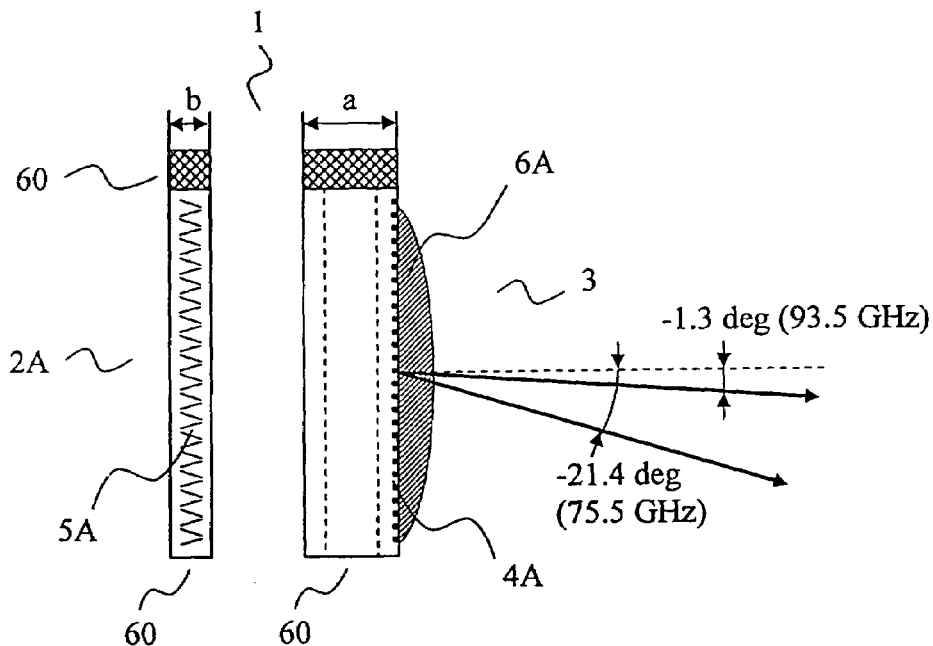
FIGS. 8A and 8B show features of a second preferred embodiment of the present invention.

FIGS. 8A and 8B are drawings of a one-dimensional millimeter wave antenna element according to aspects of the present invention. FIG. 8A shows a front view of the antenna without lens CA which is shown in the FIG. 8B side view. Antenna element 1 is constructed from WR-10 waveguide with exterior dimensions a=0.180", b=0.130" and interior dimensions a=0.100", b=0.050", slotted section of this antenna element is 24 inches long.

Figure 9:
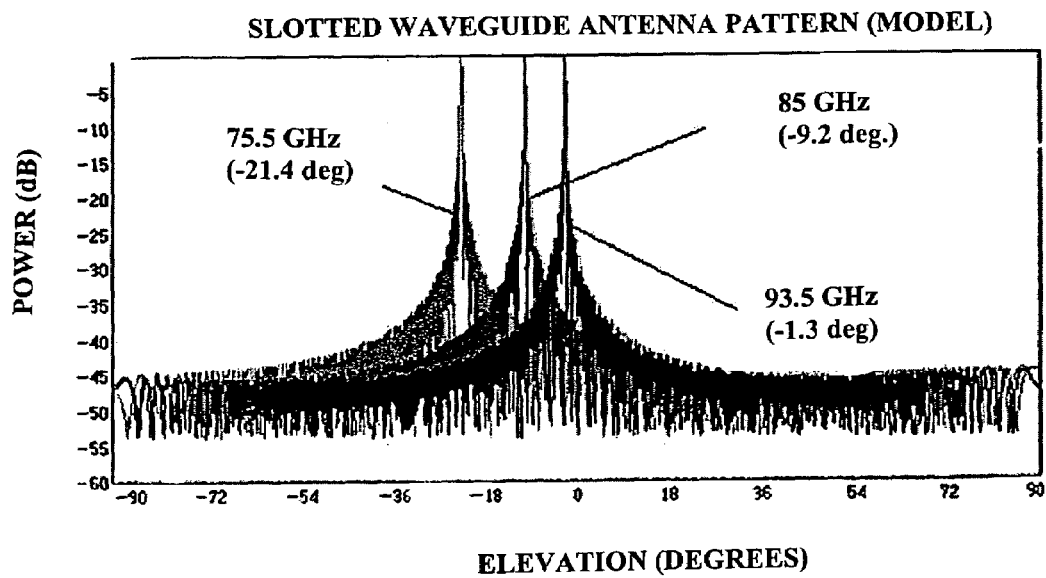
FIG. 9 is a chart of antenna patterns for the second preferred embodiment.

In fabrication of the antenna, one of the narrow walls is thinned from 40 mils to 6 mils. Then 300 inclined slots 4A are cut into the narrow wall at a spacing of 2 mm, which serve as receiving apertures (this compares to 57 slots in the 5" antenna described above). The angle of the slots varies from 3.6 degrees at the input port 60 of the waveguide and gradually increases towards the terminated end 7 in order to provide nearly constant signal coupling along its length. The direction of the angle alternates, providing a 180 degrees phase shift between successive coupling slots. This geometry creates for a vertically mounted antenna a frequency scan spanning a 20-degree vertical field of view over a 75.5 to 93.5 GHz operational band of the system. In the vertical (elevation) plane the antenna receiver element produces narrow 0.2 degree wide beams at each frequency as shown in FIG. 9. In horizontal plane its beam is 120 degrees wide due to small "b" dimension of the waveguide.

Focusing the Antenna Element

Figure 10A:
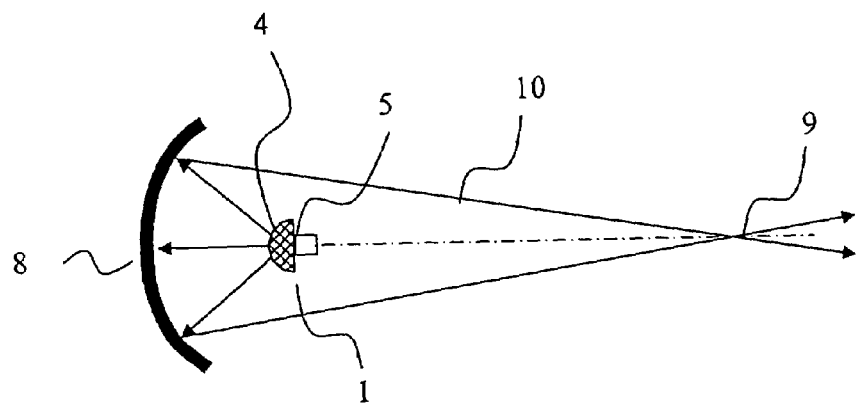
FIGS. 10A and 10B shows techniques for focusing the antenna of the second preferred embodiment.
Figure 10B:
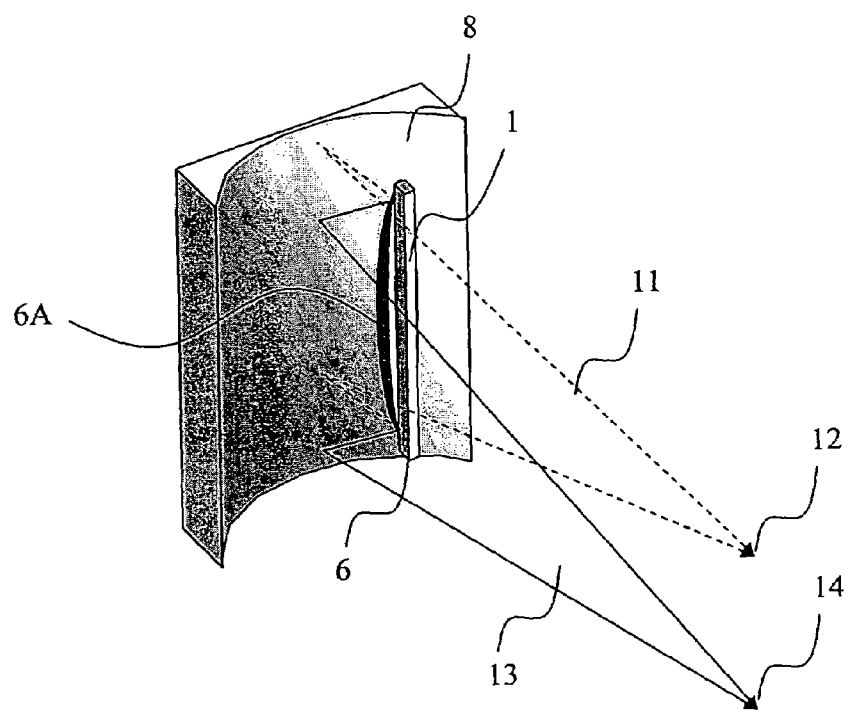

In a preferred embodiments the antenna element 1 shown in FIG. 10A is focused to 5 meters as shown in FIGS. 10A and 10B. In this case a vertically oriented elliptical cylindrical mirror 8, measuring 0.6 meter in width and 0.8 meters in height, has one of its focal lines located at the center of slots 5 of the receiver element 1 and its second focus 9 at 5 meters from the antenna as shown in FIG. 10A. This focuses the antenna beam 10 in the horizontal direction at 5 meters. A narrow rod-shaped lens 6A covers waveguide slots 4A and vertically focuses the antenna beam 11 corresponding to a frequency 93.5 GHz at 5 meters from the antenna into a focal spot 12. A lower frequency beam 13 of about 75.5 GHz is focused at the same distance from the antenna but into a different focal spot 14. Beam geometry shown in FIG. 10B assumes that the waveguide antenna signal is collected at the bottom port 6 of the slotted waveguide.

Antenna Electronics

Calibration and Amplification

In this preferred embodiment Dicke switching is used for calibration of the imaging system.

This technique utilizes, as shown in FIG. 3, a front-end switch 20 that alternates between looking at the antenna 2A and looking at a set temperature load 21. The front-end switch 20 switches at a rate of 3.84 kHz. The load can be heated by approximately 40K for one switching cycle. This allows the unit to perform a two-temperature calibration in real time, compensating for gain fluctuations in the amplifiers as well as temperature offsets. The switch itself is a W-band microwave monolithic integrated circuit (MMIC) PIN switch fabricated by MIA-Com with a transmission loss of about 1.8 dB.

The Dicke switch 20 is packaged with a low noise amplifier 62 in a signal amplification unit 64. The amplifier 62 includes a series of low noise MMIC wide band amplifiers which provide output power in the 75.5–95.5 GHz frequency band sufficient to drive mm-wave detectors within tapped delay beam-former 66. The amplifiers are required to have a wide bandwidth but maintain a low noise figure, as they set the noise temperature for the entire system. They operate over an 18 GHz bandwidth, from 75.5 GHz to 93.5 GHz. with a noise figure of approximately 7 dB. The MMIC amplifiers and other amplification unit components are preferably fabricated using a co-planar waveguide design on an indium phosphide substrate.

Tapped Delay Beam-Former

Figure 11:
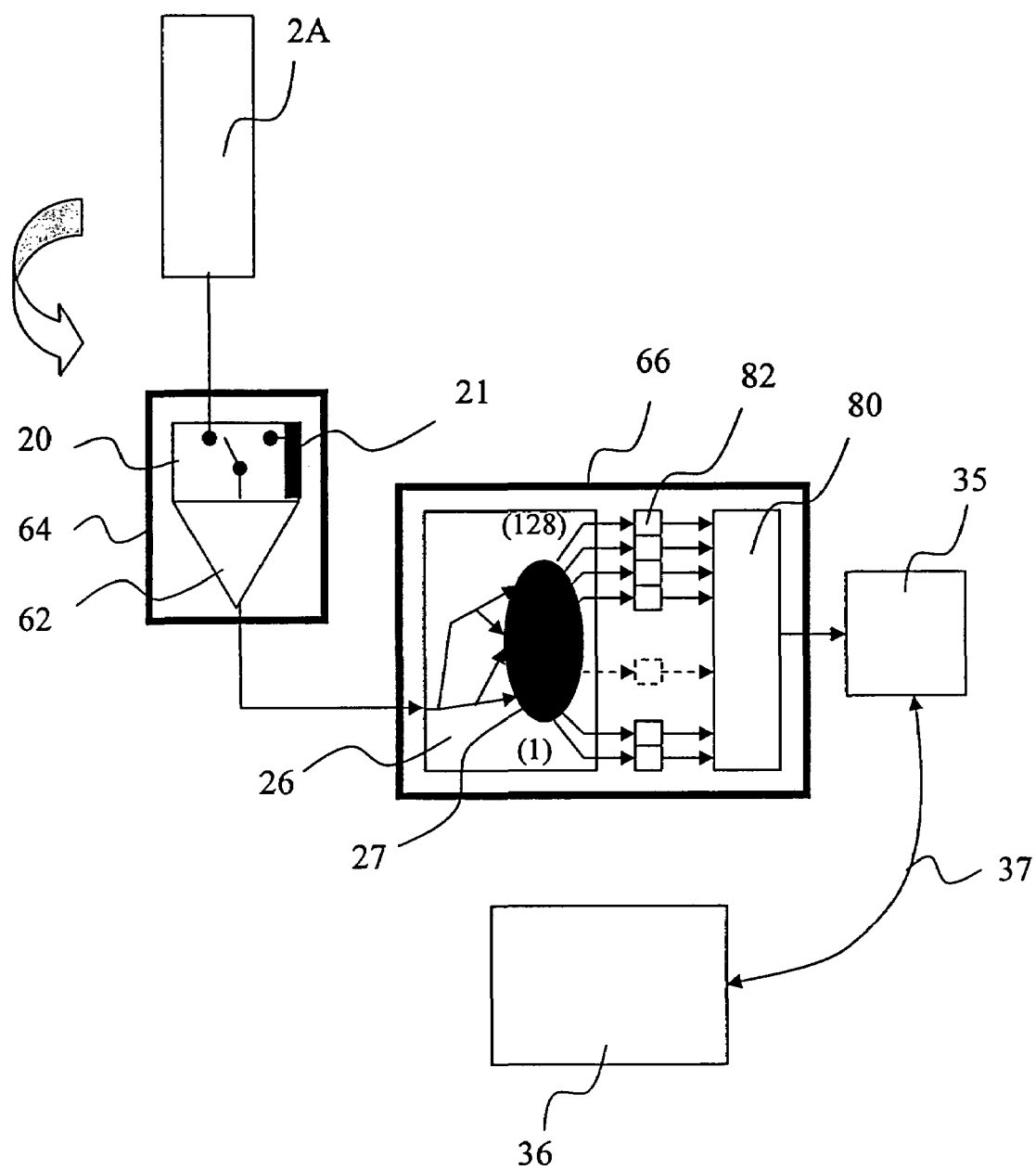
FIG. 11 is a block diagram describing the major elements of the second preferred embodiment.
Figure 12:
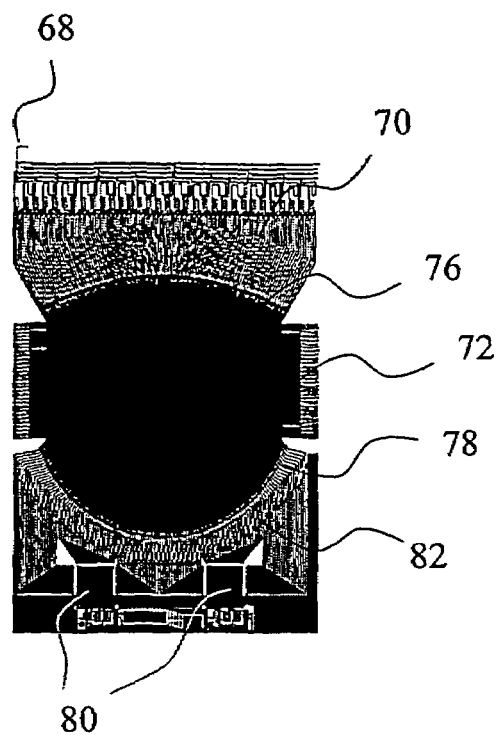
FIG. 12 is a drawing of the beam former for the second preferred embodiment.
Figure 13:
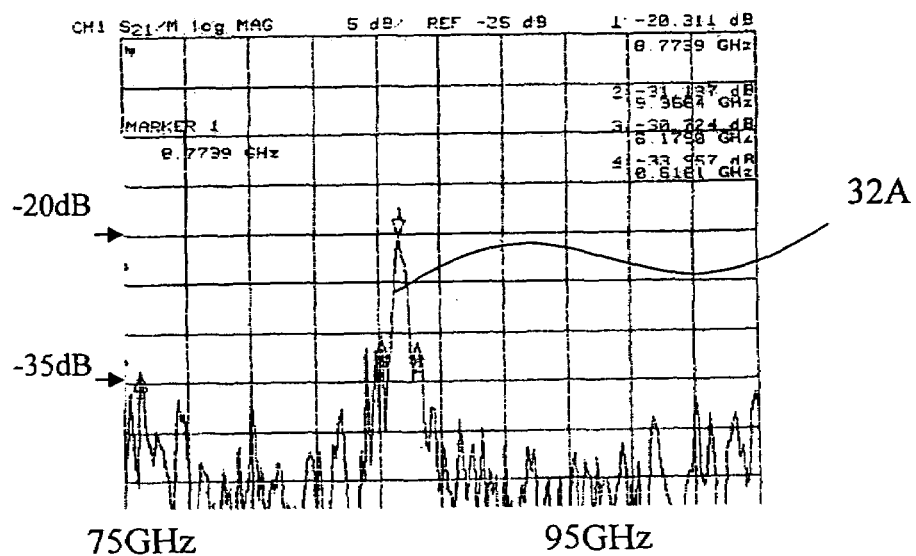
FIG. 13 shows experimental data from a prototype of the second preferred embodiment.

Broadband antenna signal from antenna 2A is first amplified and then fed into a tapped-delay beam-former 66 as shown in FIG. 11 and FIG. 12 for decomposition into frequency bins representing vertical image pixels of the antenna field of view. As shown in further detail in FIG. 12 the beam former includes an input line 68, a delay line network 70, a Rotman lens 72, horn arrays at the input 76 and output 78 of the lens. Signal lines connected to the output horns are terminated into mm-wave detector circuits 80 tuned to specific frequencies. Delay line network splits signal power among the input horns 76 and creates a constant time delay between signals radiated by adjacent horns into the Rotman lens. At the other end of the Rotman lens these signals combine constructively for a certain frequency at one of the 128 output horns 78 thus sorting mm-wave power into different output ports for different frequencies. Incremental signal delay between input horns is selected to achieve 300 MHz frequency resolution of the beam-former. This narrow band focusing capability of the beam-former has been accomplished and demonstrated experimentally by applicants as illustrated by FIG. 13. A narrow peak 32A seen in FIG. 13 represents response of one of the 128 output channels of the beam-former. Similar sharp responses have also been observed at each of the 128 output channels of the circuit for other frequencies.

The beam-former is implemented in a low loss dielectric, such as polypropylene, with smooth copper cladding. The delay lines 70 are created at very low cost with lithographic etching that creates the circuit pattern, which is then sandwiched between two ground planes in a heated press. In preferred embodiments, the smoothness of the copper making up the inside surface of the delay lines is extremely important as for the embodiment described above, applicants limit losses to about 0.5 dB per inch by requiring that the copper surface roughness not exceed 300 nanometers. Prior art microwave surface roughness specifications were 1400 to 2900 nanometers.

Signal Detection and Sampling

At a single input frequency the beam-former material is responsible for approximately 20 dB signal loss according to the data in FIG. 13. For 18 GHz broadband input an additional 21 dB signal loss due to input power splitting among 128 output channels would result in a total signal attenuation of at least 41 dB per channel. This very low power is then detected by channel detectors 82 as shown in FIG. 12. The detector output voltage is amplified, integrated and digitized by readout chips 80. Very high sensitivity mm-wave detector diodes are used in the imager such as Sb-heterostructure diodes manufactured by HRL Laboratories LLC to insure that signal-to-noise performance of the imager is not degraded in the detector and readout circuitry.

Digitized signals for each of the 128 frequency channels are received by an interface module 35 shown in FIG. 11, which communicates with computer 36 where the data is finally processed and displayed into an image. The computer is also responsible for setting optimum performance parameters of the imager such as channel gains, integration time etc. The same computer is used to control horizontal scanning of the image using a motorized rotation stage. A communication line 37 between computer and interface module 35 can be either wired or wireless, depending on which method is more suitable for a particular application.

Mechanically Scanned Imager for Field Deployment

In a preferred embodiment the above antenna system including mm-wave and low frequency signal processing electronics is integrated with a mechanical rotation stage to produce a two dimensional raster image of an object in the focal plane of the antenna.

Figure 14:
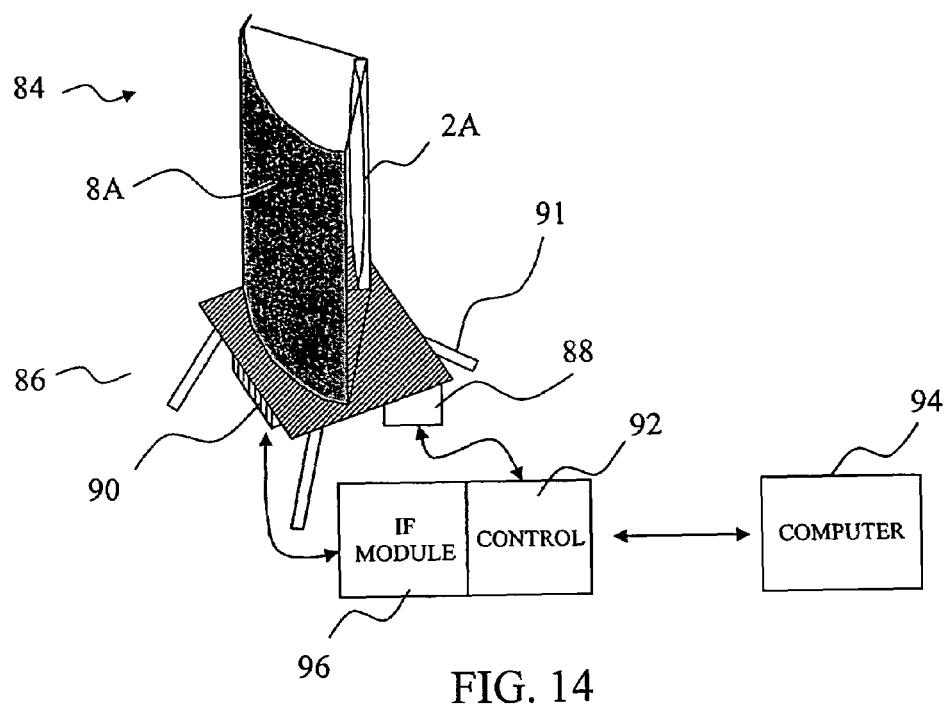
FIG. 14A is a drawing showing features of the prototype of the second preferred embodiment.
FIG. 14B is a drawing showing a preferred application of the second preferred embodiment.

This preferred configuration of the imager is shown in FIG. 14. A mm-wave frequency-scanned antenna system 84 comprising a slotted-waveguide receiver 2A and reflector 8A is mounted on top of a computer controlled precision rotation stage 86. The base of the stage to which antenna is attached is rotated horizontally by a motor 88 in steps of 0.12 degree such that the focal spot at 5 meters from the imager shifts horizontally by approximately one half of the resolution spot width per step. The stage is designed to be mechanically stable to ensure that the beam angular random walk does not exceed 0.05 degree in both horizontal and vertical directions. The rotation base and motor drive are made part of a heavy duty tripod mount 91 for easy transportation and deployment. The stepper motor is powered by a motor control module 92 that receives instruction from a remote computer station 94. A mm-wave signal processing and sampling module 90 is attached to the same rotation stage as the antenna system. Image acquisition is controlled by an interface module 96 communicating with computer 94. Computer 94 is preferably a battery powered portable PC with a flat screen for image display. Computer characteristics have to be sufficient to perform imager control functions, signal acquisition, image processing and display in real time. A computer 94 communicates with the control and interface modules 92 and 96 remotely via a cable or a wireless link depending on application requirements. Connections between module 92 and motor 88, mm-wave module 90 and interface unit 96 are preferably wired.

Figure 14B:
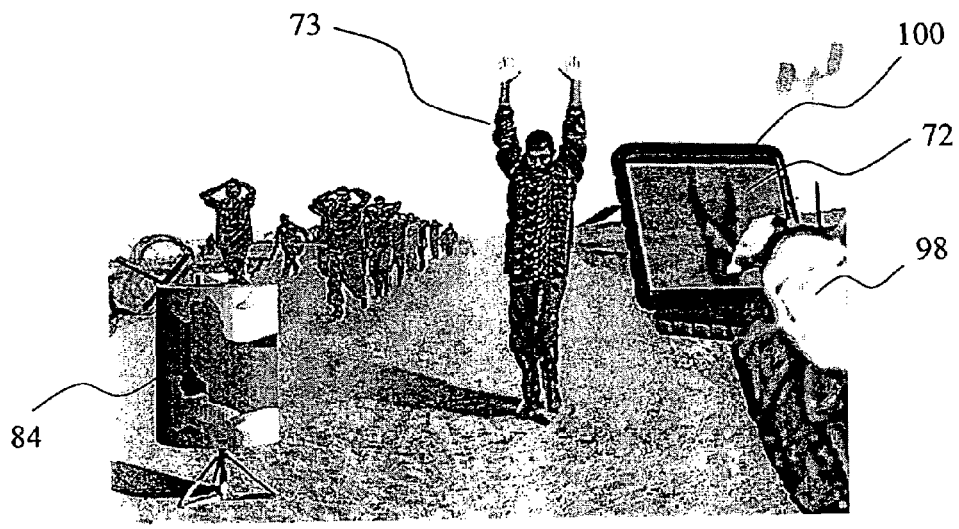

An example of imager deployment is shown in FIG. 14B illustrating POW screening for a possibility of hidden weapons. An operator 98 controls imager 84 from a safe distance using a computer 100 whereas a POW subject 73 is ordered to stand in the focal plane of the imager. A full image of the subject is scanned within a few seconds and image is displayed on the computer screen 72 for hidden weapons analysis. Multiple images of various aspects of subject can be taken sequentially if necessary.

Figure 15A:
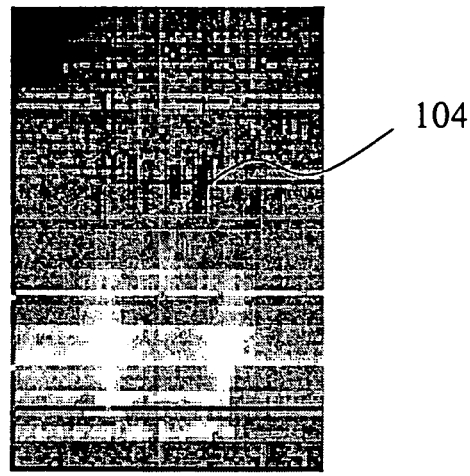
FIG. 15A–15C show sample images taken with a prototype according to the second preferred embodiment.
Figure 15B:
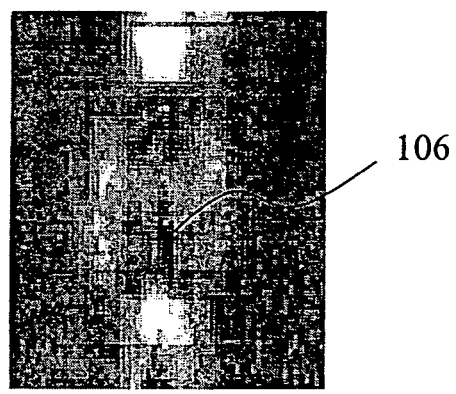
Figure 15C:
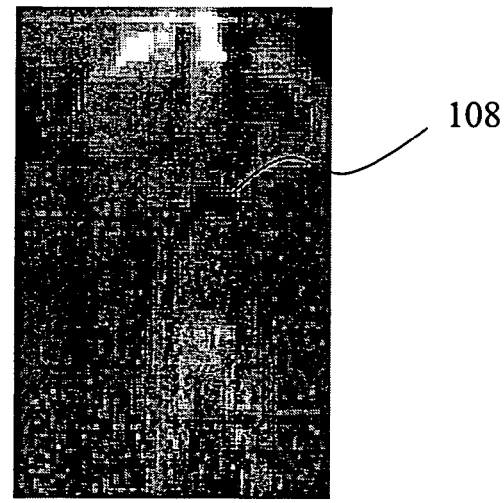

A mechanically scanned image using current state of the art technology has been successfully built and tested by applicants. The imager provided approximately 3 Kelvin temperature resolution for an image size 128 vertical and 60 horizontal pixels and acquisition time of 2 seconds. It has been found that at this temperature resolution various metal objects such as guns, large knives and metal-pipe suicide vests can be detected by the system if subject is scanned in open space that allows the sky to be reflected from the surface of the metal. FIG. 15A shows examples of such scanned imaged for a subject wearing a simulated pipe suicide west 104, FIG. 15B a metal knife 106 and FIG. 15C a hand gun 108.

Hybrid Unit with Metal Detector

The antenna can be held stationary while the persons being inspected are moved horizontally across the approximately 1-inch wide vertical field of view of the stationary antenna. This can be done with a horizontal escalator or an inexpensive treadmill. Preferably, a "walk through" metal detector is positioned adjacent to the escalator or treadmill to check for concealed metal on the persons being inspected. The depth of focus covers about 500 mm (twenty inches) from 4.75 meters to 5.25 meters, so the imager can be located about 5 meters from the metal detector to obtain focused images of people passing through it.

Portal with Metal Detector and Millimeter Wave Imager

By combining a mm-wave imaging system and a magnetic metal detector into one portal an improved overall detection capability and object classification can be accomplished. In a preferred embodiment of the hybrid portal the proposed millimeter-wave imager will operate in parallel with a commercial metal detector portal such as model SMD 600 developed by CEIA Corporation or similar.

The millimeter-wave imager and metal detector working in a tandem complement each other and bring the entire system performance to a higher level. The metal detector can be extremely sensitive to very small amounts of metals which cause problems due to high frequency of alarms set by benign objects such as coins, glasses, keys etc. In order to determine the cause of the alarm security personnel have to perform manual searches, which considerably slow the screening process and increase security costs. The millimeter-wave imager may not be as sensitive as metal detectors but it has an advantage of producing images, such that objects can be visually differentiated into either threat or no threat categories.

In a contemplated scenario where the two systems are used in the same portal the metal objects that set off a metal detector alarm are then scrutinized using millimeter-wave images within the sector or sectors that have shown the presence of such objects. The size and shape of the detected object will be used to determine if further search is required. The millimeter-wave imager has a capability to detect non-metal objects such as plastics, ceramics etc. that cannot be detected with metal detectors. Plastic and ceramic knives can be a significant threat and pose a great challenge to existing security systems which are largely based on the metal detection approach.

Figures 16A, 16B:
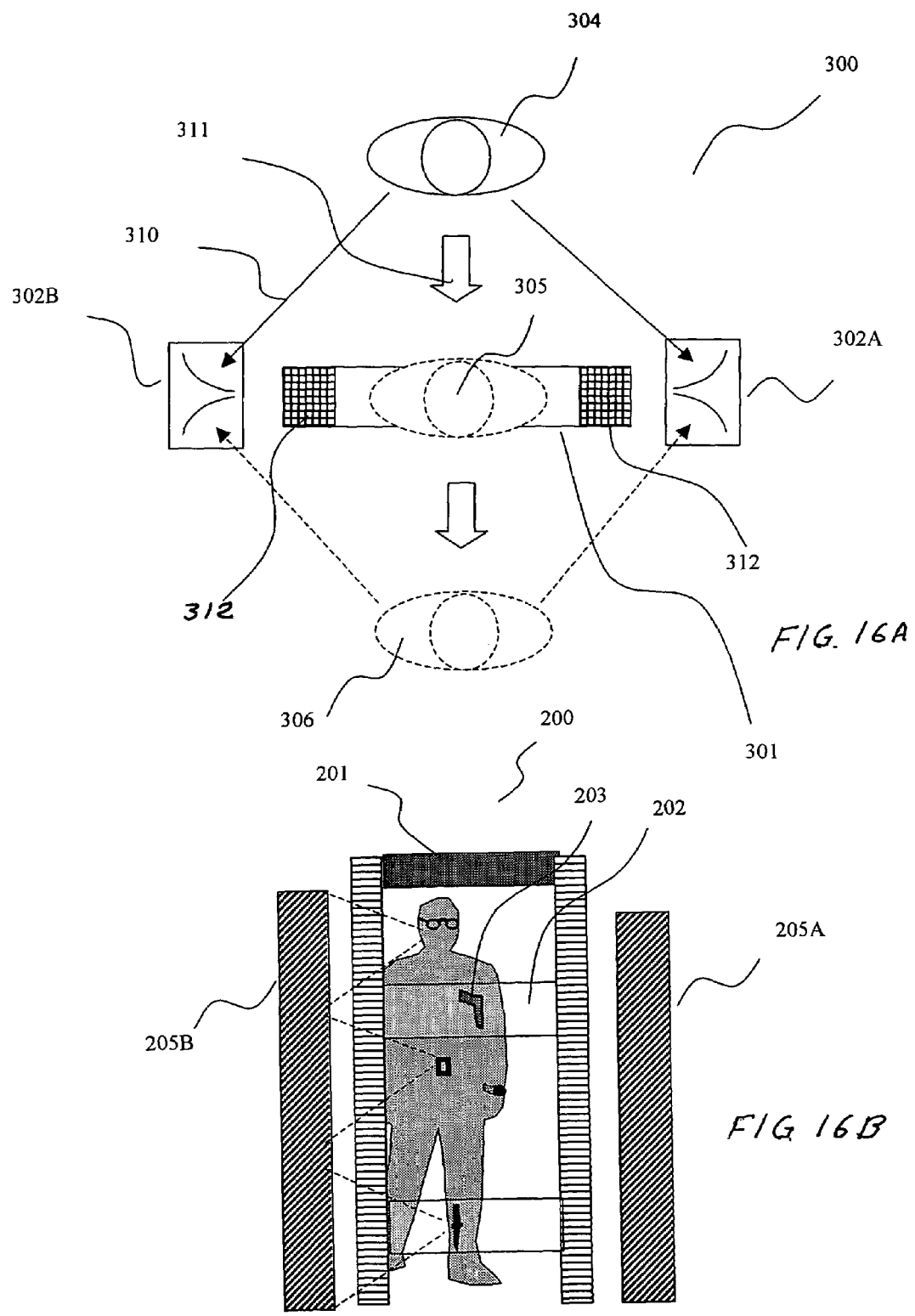
FIGS. 16A and 16B show features of a hybrid security system.
Figure 17:
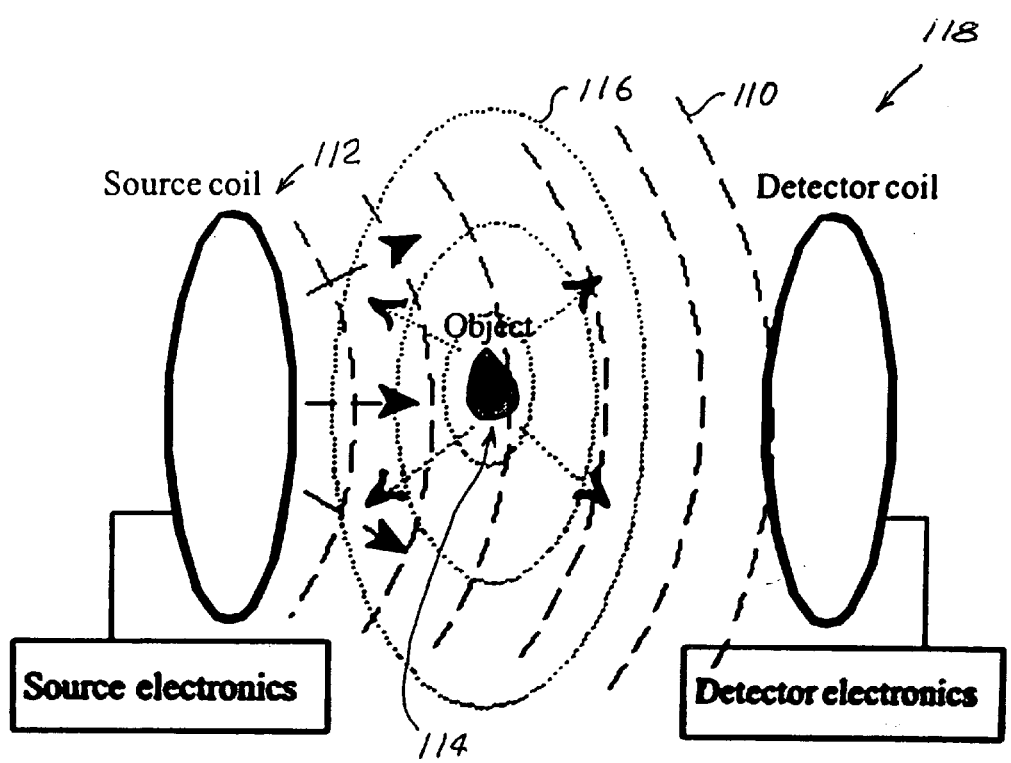
FIG. 17 show features of prior art prior art active metal detectors.

A preferred embodiment of the mm-wave and metal detector security portal 200 is shown in FIGS. 16A and 16B. Metal detector portal 201 has vertical sectors 202 with individual metal sensors. Once a metal object such as 203 is detected the portal sends an alarm signal in the form of warning lights (and/or an audible alarm) to security personnel. At the same time two millimeter-wave imagers collect thermal radiation data from the subject on the right side (205A) and two more millimeter-wave imagers collect data from left side (205B) of the portal. The metal detector warning lights (or similar indicators) in certain sectors are displayed along with the thermal images from the corresponding sectors. A decision is then made either by a human operator or automatically by a computer program, whether additional screening is required. If the metal detector does not detect metals, the thermal images may still reveal the presence of suspicious objects which would give the portal security operators a signal to perform a more detailed search.

An important advantage of the millimeter-wave imager is that in some cases it can help resolve an alarm situation without manual search. Even if additional screening is required it can help to perform it non-invasively by requiring a subject to pass through the portal one more time and by taking more mm-wave images that may clarify the nature of suspicious objects. Even though a few extra passes take some time they will be less time consuming and will not require specially assigned security personnel to perform the work.

FIG. 16A shows the top view of the preferred embodiment of the hybrid portal 300. It includes a metal detector portal 301 and millimeter-wave imaging portal 302A and 302B. The millimeter-wave portal consists of the left (302B) and right (302A) millimeter-wave imaging sensors that collect millimeter-wave radiation 310 from two opposite sides of the human subject. Subject 304 enters the portal system in the direction 311 and his frontal (left and right) surfaces are imaged by the sensors 302A and 302B. Then subject passes through the center 305 of the portal and the metal detectors 312 at different height levels sense the presence of metallic objects. At the exit from the portal 306 the rear surface millimeter-wave images of the subjects are taken by the mm-wave sensors 302A and 302B. This completes a screening cycle. If alarms are set off, a second screening can resolve the situation without manual search.

Hand Held Imager—Detector

FIG. 18A is a drawing of a hand held millimeter wave image sensor 119. The sensor is the basic imager sensor described above (see FIGS. 2A and 2B) with the antenna focused at 19 inches along the light path (15.5 inches from the back side of mirror 8) to produce a one dimensional image of a 6-inch×½-inch field of view located at the focus. (Note, however, that for this unit the antenna is positioned horizontally so that a one dimensional horizontal image is produced by a stationary unit and a vertical scan produces the two-dimensional image.) In preferred embodiments the frame rate of the sensor is 30 Hz, so a two dimensional image of a 6-inch×6-inch field of view is produced by a one-second scan produced by arm motion of the operator. Scanning significantly faster than 6 inches per second produces some blurring. Scanning significantly more slowly produces better contrast but the images will be somewhat distorted. The sensor is contained in housing 120 with cover 122 that is transparent to millimeter waves. For best results the front of the sensor is held at about 12 inches from the surface being scanned. The unit weighs about 4 pounds so an ergonomic handle is provided with an arm support 124. The handle 125 is grasped at location 126. Images of target regions are displayed on screen 128. Batteries for the unit are contained in handle 125.

In preferred embodiments metal detections coils 128 are included in the unit as shown in FIG. 18B and produce fluctuating magnetic fields to produce eddy currents in conducting objects producing other magnetic fields. These eddy current produced magnetic fields are in turn picked up by the same coils producing currents that indicate the presence of the conducting objects. For metal detection the unit is scanned as close as feasible of the surface being scanned.

OTHER EMBODIMENTS

Figure 6:
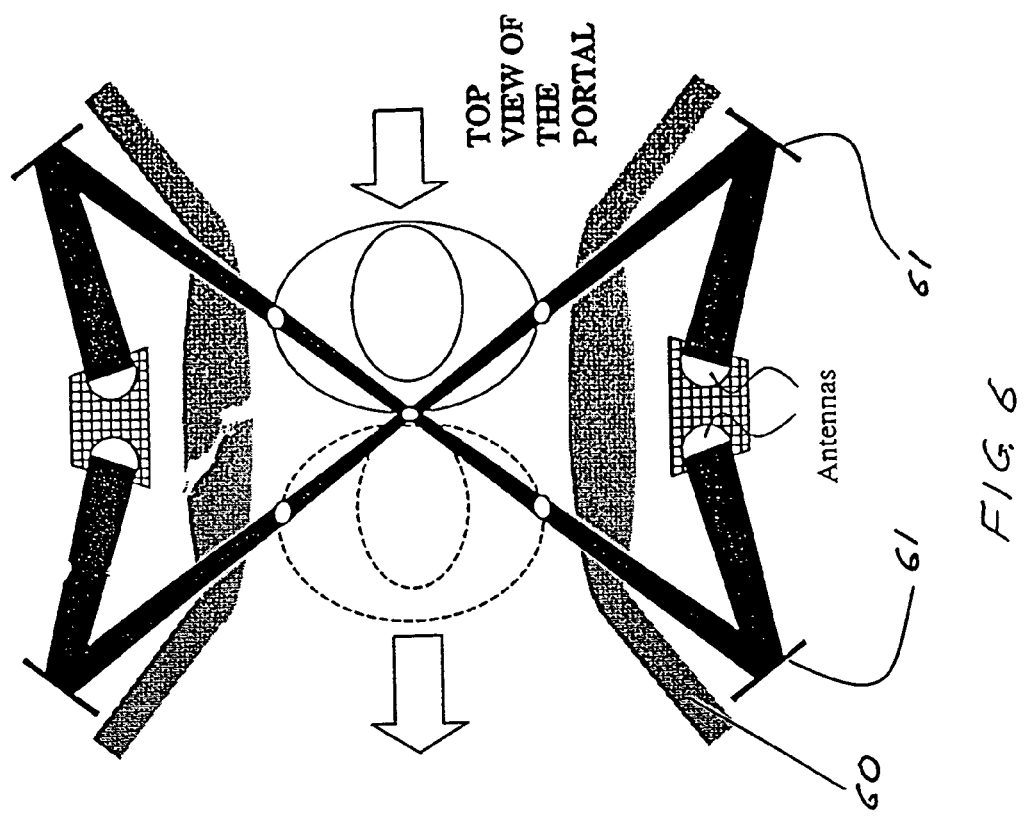
FIG. 6 shows an embodiment with a large depth of field.
Figure 5:
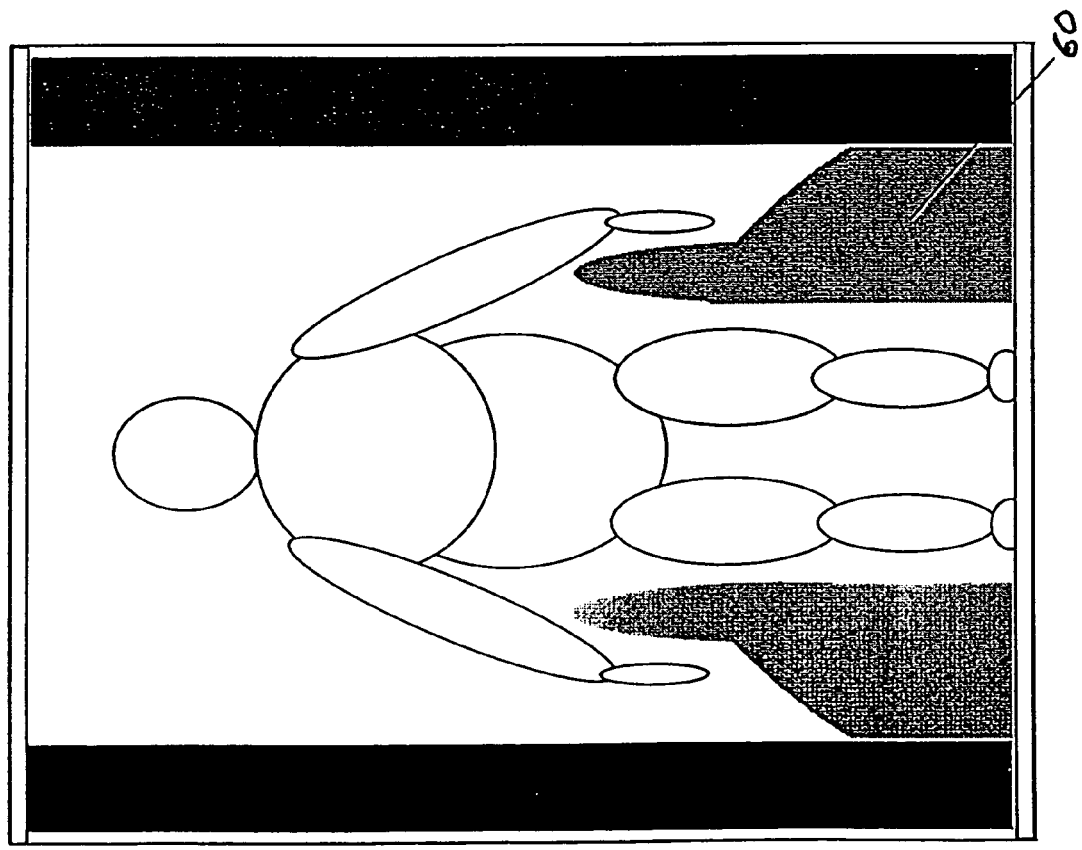
FIG. 5 shows a person passing through a screening portal.
Figure 7A:
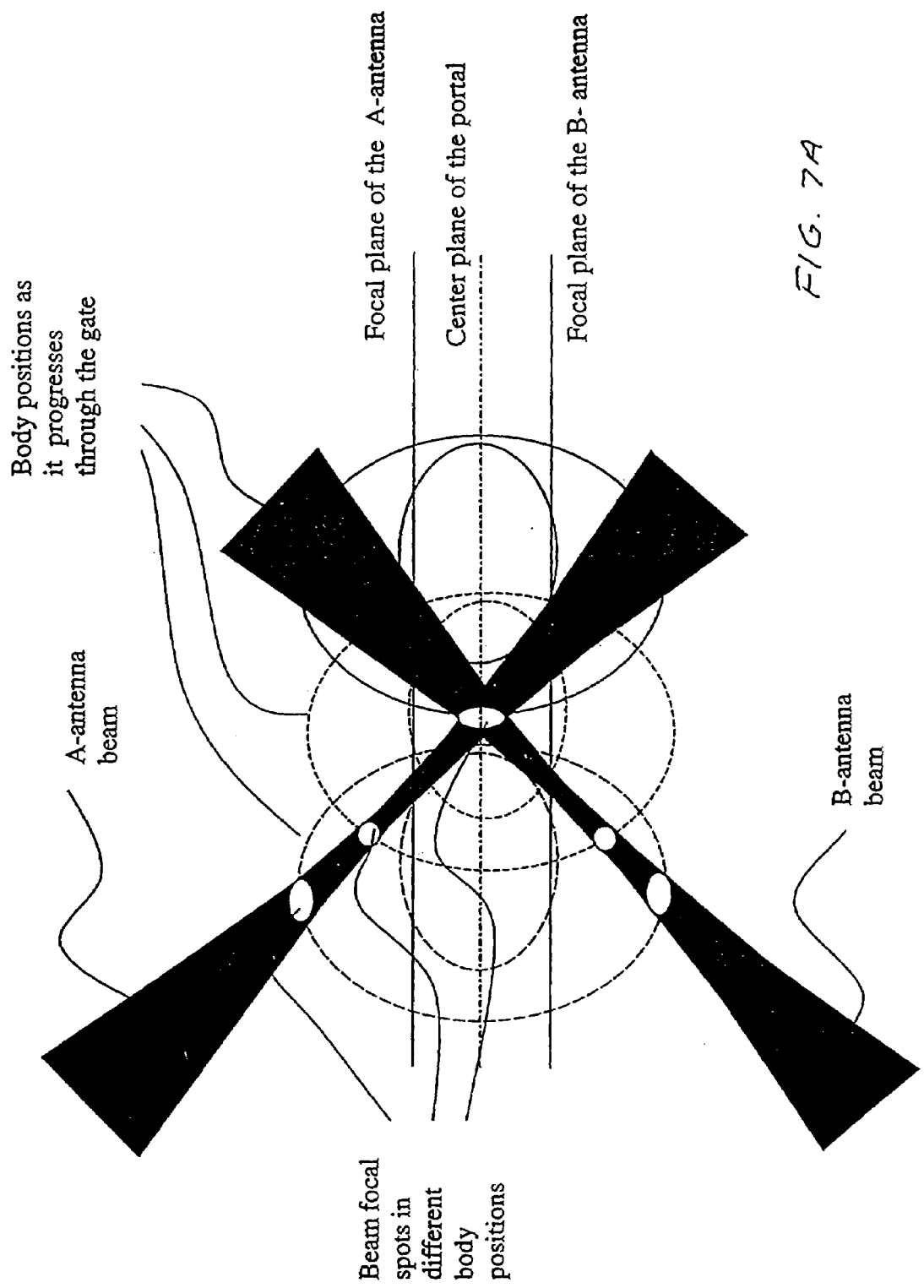
FIGS. 7A and 7B show the relationship between resolution and distance between antenna and target.
Figure 7B:
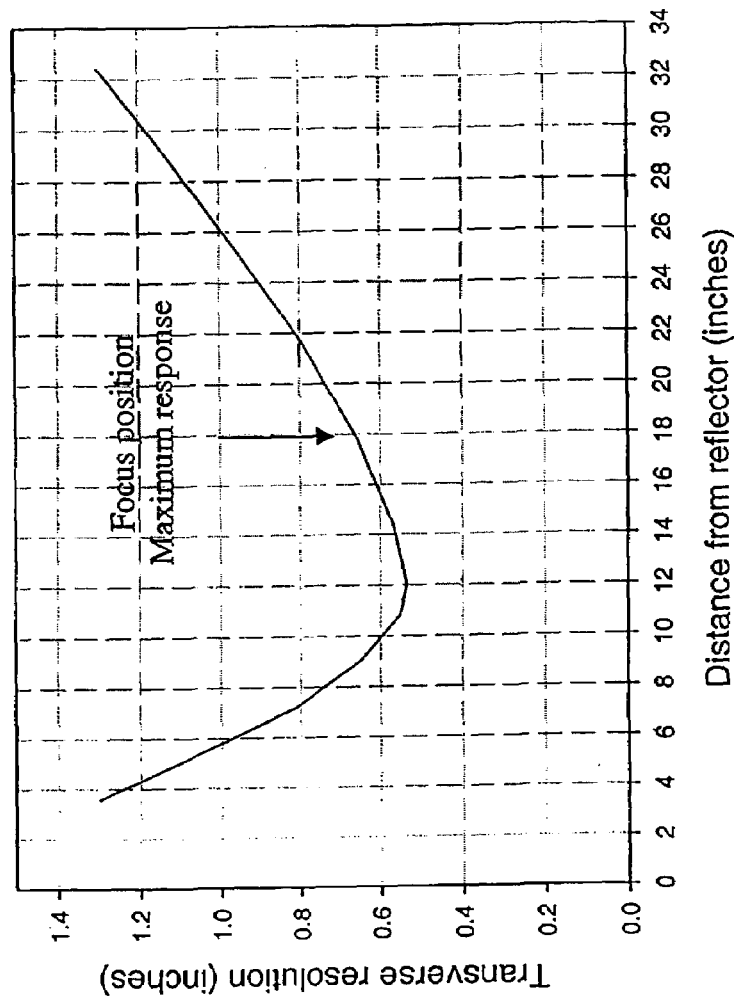

Persons skilled in the art of contraband detection will recognize that many modifications can be made to the examples presented above. For example, instead of having the person pass through the portal on a horizontal escalator as described above, the person could be required to walk through the portal at a designated pace such as about ¼ the normal walking speed. A millimeter wave transparent barrier 60 can be placed in the portal as shown in FIGS. 5 and 6 in order to assure the proper positioning of the persons relative to the antenna elements. Various tradeoffs are possible in the selection of the focal position of the antenna elements. Positioning the antenna optically farther away from the persons being screened and increasing the focal length can provide greater depth of focus of the antenna elements. This can be done with mirrors 61 as shown in FIG. 6 to keep the unit compact. In FIG. 7 an estimate is provided of the approximate transverse resolution of the scanner as a function of distance of the between the surface being imaged and the antenna elements.

While the present invention has been described above in terms of particular embodiments, persons skilled in the art will recognize that many other changes may be made. For example, infrared or visible cameras synchronized with the millimeter wave screener may be adapted to provide correlated identity and reference information. Better resolution could be achieved by providing automatic focusing of the antenna elements. Alternatively, additional sets of elements could be provided with various focal lengths with processor software programmed to select the best focus for each portion of the target person as he/she passes through the portal. Increasing the size of the antenna could also improve the resolution. The person passing through the portal could be rotated before a single stack or they could be rotated before the four stacks. For applications where plenty of screening time is available a single element or fewer elements could be scanned across a person being screened, either automatically or by hand. Modifications to the amplifier shown in FIG. 4 could be made but preferably gains of at least 50 dB should be provided. The single stick imager shown in FIGS. 8A and 8B is positioned vertically and rotated horizontally. In other embodiments, these directions could be reviewed. The extent of rotation could be any amount from a few degrees for the application described above to a 360 degree complete rotation. Also, the single stick imager could be fixed in position and the subject being imaged could be moved laterally across the vertical beam. Also, the subject could be rotated in the vertical beam. Therefore, the scope of the present invention should be determined by the appended claims and their legal equivalents.

We claim:

1. A hybrid concealed weapon and contraband imaging and detection system comprising:
   A) a metal detector, and
   B) a millimeter wave imaging system comprising:
   1) at least one millimeter wave frequency scanning antenna for collecting frequency dependent beams of millimeter wave radiation from a narrow one-dimensional field of view;
   2) a millimeter wave amplifier for amplifying at the collected frequencies said millimeter wave radiation;
   3) a beam-former for separating said amplified collected radiation to produce frequency dependent signals corresponding to said frequency dependent beams, said beam-former comprising:
      1) a plurality of delay lines,
      2) a millimeter wave lens, and
      3) a plurality of millimeter wave power detectors; and 4) a sampling circuit for reading out frequency dependent signals to produce a one-dimensional image of the antenna field of view.

2. The hybrid system as in claim 1 and also comprising a focusing means for focusing said frequency-scanning antenna.

3. The hybrid system as in claim 2 wherein said focusing means comprises a cylindrical reflector and a cylindrical lens.

4. The hybrid system as in claim 1 wherein said millimeter wave amplifier comprises three MMIC amplifiers fabricated on an indium phosphate substrate and a band pass filter.

5. The hybrid system as in claim 4 wherein said amplifier comprises a co-planar waveguide design.

6. The hybrid system as in claim 4 wherein said amplifier provides gains of at least 50 dB.

7. The hybrid system as in claim 1 wherein said delay lines are comprised of etched copper to create circuit patterns of varying lengths.

8. The hybrid system as in claim 7 wherein said delay lines define copper surfaces having surface roughness less than 300 nanometers.

9. The hybrid system as in claim 1 wherein said at least one frequency scanning antenna is one frequency scanning antenna.

10. The hybrid system as in claim 1 wherein said one frequency scanning is at least 20 inches long.

11. The hybrid system as in claim 1 wherein said one frequency scanning antenna is about 26 inches long and comprises about 300 inclined slots functioning as receiving apertures.

12. The hybrid system as in claim 8 wherein said at least one frequency scanning antenna is one frequency scanning antenna.

13. The hybrid system as in claim 8 wherein said one frequency scanning is at least 20 inches long.

14. The hybrid system as in claim 8 wherein said one frequency scanning antenna is about 26 inches long and comprises about 300 inclined slots functioning as receiving apertures.

15. The hybrid system as in claim 1 wherein said millimeter wave imaging system is a single stick millimeter wave imaging system comprising:
   A) a single millimeter wave frequency scanning antenna for collecting frequency dependent beams of millimeter wave radiation from a narrow one-dimensional field of view;
   B) a millimeter wave amplifier for amplifying at the collected frequencies said millimeter wave radiation;
   C) a beam-former for separating said amplified collected radiation to produce frequency dependent signals corresponding to said frequency dependent beams, said beam-former comprising:
      1) a plurality of delay lines,
      2) a millimeter wave lens, and
      3) a plurality of millimeter wave power detectors; and
   D) a sampling circuit for reading out frequency dependent signals to produce a one-dimensional image of the antenna field of view.

16. The hybrid system as in claim 15 and also comprising a focusing means for focusing said frequency-scanning antenna.

17. The hybrid system as in claim 15 wherein said focusing means comprises a cylindrical reflector and a cylindrical lens.

18. The imaging system as in claim 15 wherein said millimeter wave amplifier comprises three MMIC amplifiers fabricated on an indium phosphate substrate and a band pass filter.

19. The hybrid system as in claim 15 wherein said amplifier comprises a co-planar waveguide design.

20. The hybrid system as in claim 15 wherein said amplifier provides gains of at least 50 dB.

21. The hybrid system as in claim 15 wherein said delay lines are comprised of etched copper to create circuit patterns of varying lengths.

22. The hybrid system as in claim 15 wherein said delay lines define copper surfaces having surface roughness less than 300 nanometers.

23. A hybrid portal concealed weapon and contraband imaging and detection system comprising:
   A) a portal metal detector, and
   B) a portal contraband screener comprising a plurality of millimeter wave sensors, each of said plurality of millimeter wave sensors comprising:
      1) at least one millimeter wave frequency scanning antenna for collecting frequency dependent beams of millimeter wave radiation from a narrow one-dimensional field of view;
      2) a millimeter wave amplifier for amplifying at the collected frequencies said millimeter wave radiation;
      3) a beam-former for separating said amplified collected radiation to produce frequency dependent signals corresponding to said frequency dependent beams, said beam-former comprising:
         a) a plurality of delay lines,
         b) a millimeter wave lens, and
         c) a plurality of millimeter wave power detectors; and
      4) a sampling circuit for reading out frequency dependent signals to produce a one-dimensional image of the antenna field of view.

24. The hybrid system as in claim 23 wherein each of said plurality of millimeter wave sensors also comprises a focusing means for focusing said frequency-scanning antenna.

25. The hybrid system as in claim 24 wherein said focusing means comprises a cylindrical reflector and a cylindrical lens.

26. The hybrid system as in claim 25 wherein each of said millimeter wave amplifiers comprises three MMIC amplifiers fabricated on an indium phosphate substrate and a band pass filter.

27. The hybrid system as in claim 26 wherein said amplifier comprises a co-planar waveguide design.

28. The hybrid system as in claim 26 wherein said amplifier provides gains of at least 50 dB.

29. The hybrid system as in claim 23 wherein each of said delay lines are comprised of etched copper to create circuit patterns of varying lengths.

30. The hybrid system as in claim 29 wherein said delay lines define copper surfaces having surface roughness less than 300 nanometers.

31. A hybrid portal concealed weapon and contraband imaging and detection system comprising:
   A) a metal detector, and
   B) a portal contraband screener comprising a plurality of millimeter wave sensors, each of said plurality of millimeter wave sensors comprising:
      1) at least one millimeter wave frequency scanning antenna for collecting frequency dependent beams of millimeter wave radiation from a narrow one-dimensional field of view;

2) a fast switch for calibration;
3) a millimeter wave amplifier for amplifying at the collected frequencies said millimeter wave radiation, said amplifier comprising at least three MMIC amplifiers fabricated on an indium phosphate substrate and a band pass filter;
4) a beam-former for separating said amplified collected radiation to produce frequency dependent signals corresponding to said frequency dependent beams, said beam-former comprising:
  a) a plurality of delay lines,
  b) a millimeter wave lens, and
  c) a plurality of millimeter wave power detectors; and
5) a sampling circuit for reading out frequency dependent signals to produce a one-dimensional image of the antenna field of view,
6) focusing means for focusing the sensor.

32. The hybrid system as in claim 31 wherein said focusing means comprises a cylindrical reflector and a cylindrical lens.

33. The hybrid system as in claim 31 wherein said amplifier comprises a co-planar waveguide design.

34. The hybrid system as in claim 31 wherein said amplifier provides gains of at least 50 dB.

35. The hybrid system as in claim 31 wherein each of said delay lines are comprised of etched copper to create circuit patterns of varying lengths.

36. The hybrid system as in claim 35 wherein said delay lines define copper surfaces having surface roughness less than 300 nanometers.

37. The hybrid system as in claim 31 wherein said plurality of sensors is arranged in four stacks each stack comprising at least 16 sensors.

38. A hybrid portal concealed weapon and contraband imaging and detection system comprising:
A) a portal metal detector, and
B) a millimeter wave sensor comprising:
1) a millimeter wave frequency scanning antenna for collecting frequency dependent beams of millimeter wave radiation from a narrow one-dimensional field of view;
2) a fast switch for calibration;
3) a millimeter wave amplifier for amplifying at the collected frequencies said millimeter wave radiation, said amplifier comprising at least three MMIC amplifiers fabricated on an indium phosphate substrate and a band pass filter;
4) a beam-former for separating said amplified collected radiation to produce frequency dependent signals corresponding to said frequency dependent beams, said beam-former comprising:
  a) a plurality of delay lines,
  b) a millimeter wave lens, and
  c) a plurality of millimeter wave power detectors; and
5) a sampling circuit for reading out frequency dependent signals to produce a one-dimensional image of the antenna field of view.

39. The hybrid system as in claim 38 wherein said focusing means comprises a cylindrical reflector and a cylindrical lens.

40. The hybrid system as in claim 38 wherein said amplifier comprises a co-planar waveguide design.

41. The hybrid system as in claim 38 wherein said amplifier provides gains of at least 50 dB.

42. The hybrid system as in claim 38 wherein each of said delay lines are comprised of etched copper to create circuit patterns of varying lengths.

43. The hybrid system as in claim 42 wherein said delay lines define copper surfaces having surface roughness less than 300 nanometers.

* * * * *